United States Patent
Ueda et al.

(10) Patent No.: US 11,970,837 B2
(45) Date of Patent: Apr. 30, 2024

(54) WORKING MACHINE CONTROL DEVICE

(71) Applicant: KOBELCO CONSTRUCTION MACHINERY CO., LTD., Hiroshima (JP)

(72) Inventors: Kazuhiro Ueda, Hiroshima (JP); Seiji Saiki, Hiroshima (JP); Hideki Yoshihara, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 842 days.

(21) Appl. No.: 16/981,590

(22) PCT Filed: Jan. 24, 2019

(86) PCT No.: PCT/JP2019/002234
§ 371 (c)(1),
(2) Date: Sep. 16, 2020

(87) PCT Pub. No.: WO2019/187560
PCT Pub. Date: Oct. 3, 2019

(65) Prior Publication Data
US 2021/0054597 A1    Feb. 25, 2021

(30) Foreign Application Priority Data
Mar. 29, 2018    (JP) ................... 2018-064142

(51) Int. Cl.
*E02F 9/20*    (2006.01)
*E02F 3/32*    (2006.01)
(Continued)

(52) U.S. Cl.
CPC ............ *E02F 9/205* (2013.01); *E02F 9/2004* (2013.01); *E02F 9/264* (2013.01); *G06V 20/56* (2022.01); *H04N 7/18* (2013.01); *E02F 3/32* (2013.01)

(58) Field of Classification Search
CPC ......... E02F 9/205; E02F 9/2004; E02F 9/264; E02F 3/32; E02F 9/123; G06V 20/56;
(Continued)

(56) References Cited

U.S. PATENT DOCUMENTS

2017/0121938 A1* 5/2017 Yamada ................ E02F 9/2012
2017/0322624 A1  11/2017 Niccolini et al.
(Continued)

FOREIGN PATENT DOCUMENTS

CN    105934945 A    9/2016
CN    106787449 A    5/2017
(Continued)

OTHER PUBLICATIONS

International Search Report dated Mar. 26, 2019 in PCT/JP2019/002234 filed on Jan. 24, 2019, 2 pages.
(Continued)

*Primary Examiner* — Anne Marie Antonucci
*Assistant Examiner* — Jewel Ashley Kuntz
(74) *Attorney, Agent, or Firm* — Oblon, McClelland, Maier & Neustadt, L.L.P.

(57) ABSTRACT

A working machine control device includes a camera that obtains a captured image by imaging a particular part that is a part of a lower travelling body, and a controller, in which the controller includes a setting unit that sets a target slewing angle of an upper slewing body with respect to the lower travelling body, and a display control unit that causes a display unit to display a display screen in which a target image indicating a target position of the particular part is
(Continued)

displayed in a superimposed manner at a position on the captured image, the position being where the particular part is displayed when a slewing angle of the upper slewing body with respect to the lower travelling body reaches the target slewing angle.

6 Claims, 7 Drawing Sheets

(51) Int. Cl.
*E02F 9/26* (2006.01)
*G06V 20/56* (2022.01)
*H04N 7/18* (2006.01)

(58) Field of Classification Search
CPC .. H04N 7/18; H04N 7/183; G05D 2201/0202; G05D 1/0038
See application file for complete search history.

(56) References Cited

U.S. PATENT DOCUMENTS

| | | | |
|---|---|---|---|
| 2018/0094408 A1* | 4/2018 | Shintani | E02F 9/26 |
| 2018/0313062 A1* | 11/2018 | Tsukamoto | E02F 9/20 |
| 2020/0032489 A1 | 1/2020 | Yamazaki et al. | |

FOREIGN PATENT DOCUMENTS

| | | | |
|---|---|---|---|
| JP | 2007-198040 A | 8/2007 | |
| JP | 2012-82608 A | 4/2012 | |
| JP | 2015-21246 A | 2/2015 | |
| JP | 2017-92908 A | 5/2017 | |
| JP | 2017-194381 A | 10/2017 | |
| JP | 2017-201114 A | 11/2017 | |
| WO | WO 2015/008751 A1 | 1/2015 | |
| WO | WO-2015008751 A1 * | 1/2015 | ............... B60R 1/00 |
| WO | WO 2015/155845 A1 | 10/2015 | |
| WO | WO 2017/047826 A1 | 3/2017 | |
| WO | WO 2017/115810 A1 | 7/2017 | |

OTHER PUBLICATIONS

Extended European Search Report dated Nov. 9, 2020 in European Patent Application No. 19775627.3, 9 pages.
Combined Chinese Office Action and Seach Report dated Nov. 3, 2021 in Chineses Patent Application No. 201980021196.3 (with English summary), 10 pages.

* cited by examiner

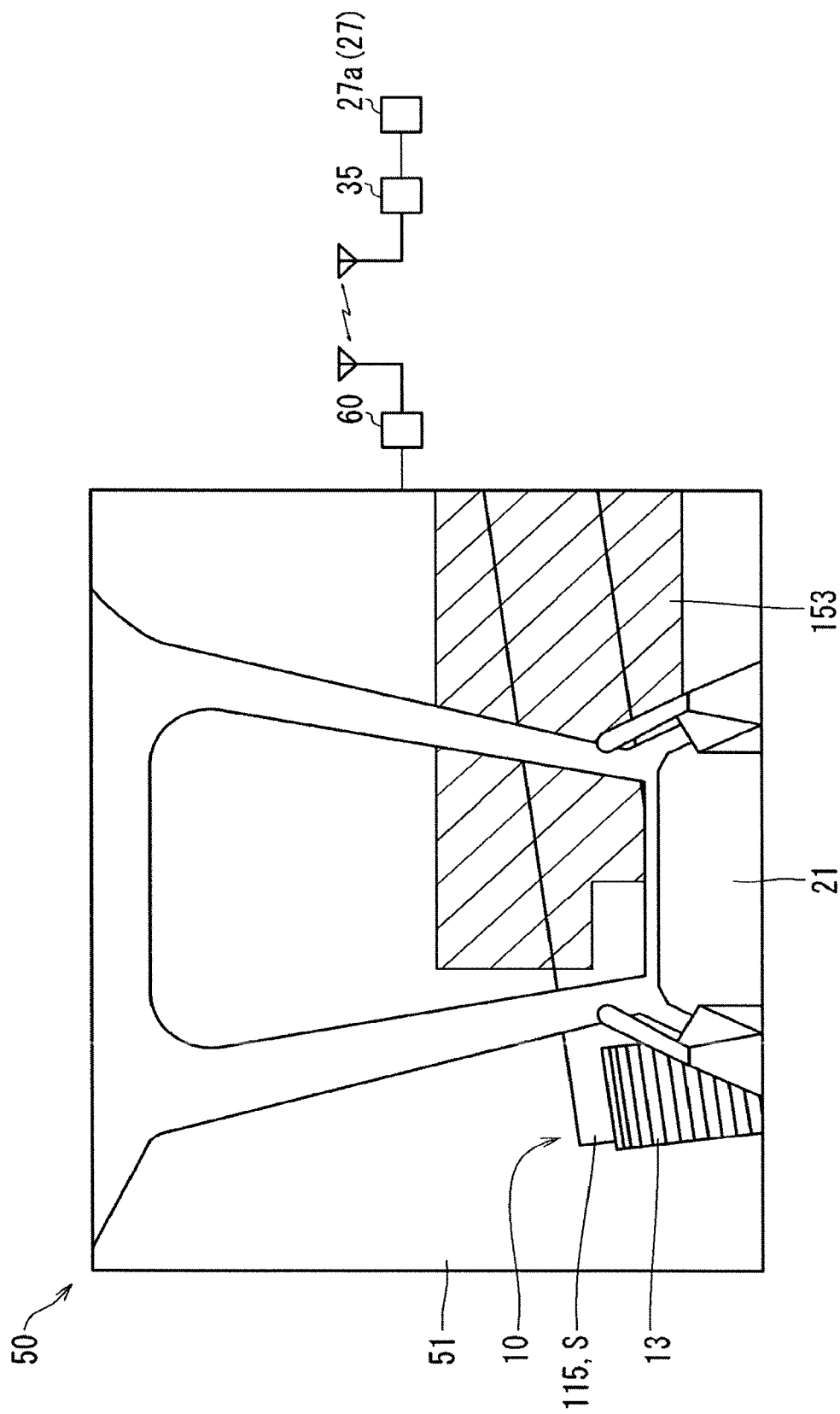

WORKING MACHINE CONTROL DEVICE

TECHNICAL FIELD

The present invention relates to a working machine control device capable of remotely controlling a working machine.

BACKGROUND ART

In recent years, technical development of a remote control system in which an operator remotely controls a working machine from a remote place has been advanced. When the working machine is remotely controlled, the operator visually recognizes the situation around the working machine through an image captured by a camera installed in the working machine. Accordingly, when remote control is performed, visual information that the operator can obtain is limited as compared with a case of controlling in the cab. Consequently, there is a problem that the operator cannot directly see a lower travelling body, and it is difficult to match the slewing angle of an upper slewing body with respect to the lower travelling body with a target slewing angle.

For example, Patent Literature 1 discloses a construction machine that displays a slewing positional relationship of an upper slewing body with the lower travelling body on a display, and also displays an image indicating a travelling direction of the construction machine on the display on the basis of the operator seated on the driver's seat when an operation of travelling the lower travelling body is input.

However, in Patent Literature 1, since the travelling direction of the construction machine is only presented to the operator through the display, even if the technique of Patent Literature 1 is applied to the remote control, there is a problem that the operator cannot easily match the slewing angle of the upper slewing body with the target slewing angle.

Further, Patent Literature 1 is a technology that is premised on that the operator operates the working machine in the cab. Therefore, in Patent Literature 1, since the operator can directly see the lower travelling body, the above-described problem peculiar to remote control such that it is difficult to match the slewing angle of the upper slewing body with the target slewing angle cannot happen.

CITATION LIST

Patent Literature

Patent Literature 1: JP 2007-198040 A

SUMMARY OF INVENTION

Accordingly, it is an object of the present invention to provide a working machine control device capable of easily matching a slewing angle of an upper slewing body with respect to a lower travelling body with a target slewing angle. A working machine control device according to one aspect of the present invention is a working machine control device that remotely controls a working machine including a lower travelling body and an upper slewing body that slews with respect to the lower travelling body, the working machine control device including:

a display unit;
a camera that is disposed on the upper slewing body and obtains a captured image by imaging a particular part that is a part of the lower travelling body; and
a controller,
in which the controller includes:
a setting unit that sets a target slewing angle of the upper slewing body with respect to the lower travelling body; and
a display control unit that causes the display unit to display a display screen in which a target image indicating a target position of the particular part is displayed in a superimposed manner at a position on the captured image, the position being where the particular part is displayed when a slewing angle of the upper slewing body with respect to the lower travelling body reaches the target slewing angle.

With the above configuration, the slewing angle of the upper slewing body with respect to the lower travelling body can be easily matched with the target slewing angle.

BRIEF DESCRIPTION OF DRAWINGS

FIG. 4 is a view illustrating a captured image taken by an in-cab camera 27a.

FIG. 7 is a view illustrating a modification example of a captured image.

DESCRIPTION OF EMBODIMENTS

Figure 1:
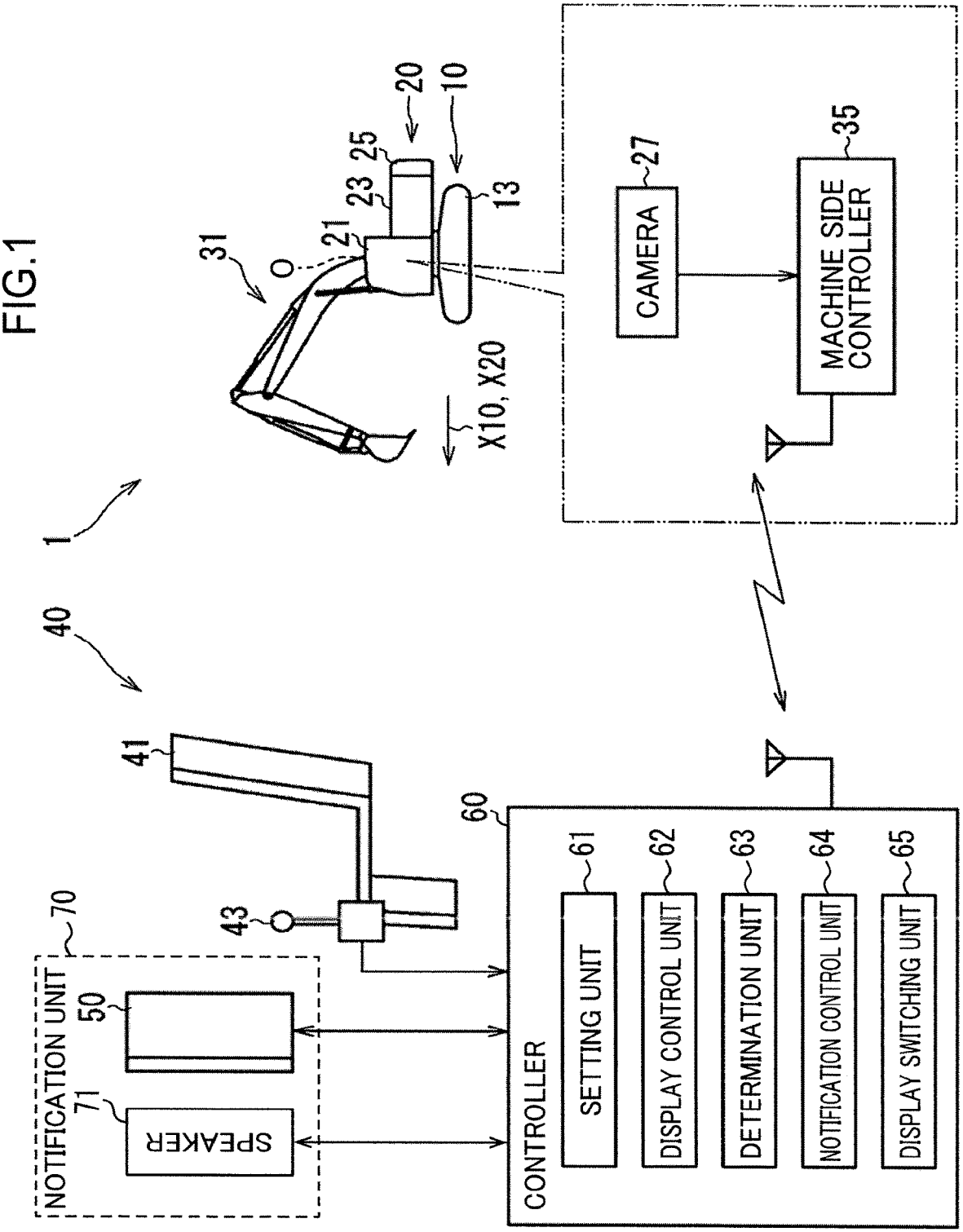
FIG. 1 is a block diagram illustrating a working machine 1 and a working machine control device 40.

With reference to FIGS. 1 to 5, a working machine control device 40 illustrated in FIG. 1 and a working machine 1 in which the working machine control device 40 is used will be described.

The working machine 1 is, for example, constituted of a construction machine that performs a construction work. The working machine 1 is, for example, a hydraulic excavator or the like. Particularly in the present embodiment, the working machine 1 employs a remote shovel that is capable of being remote controlled. The working machine 1 includes a lower travelling body 10, an upper slewing body 20, an attachment 31, a camera 27, and a machine side controller 35.

Figure 2:
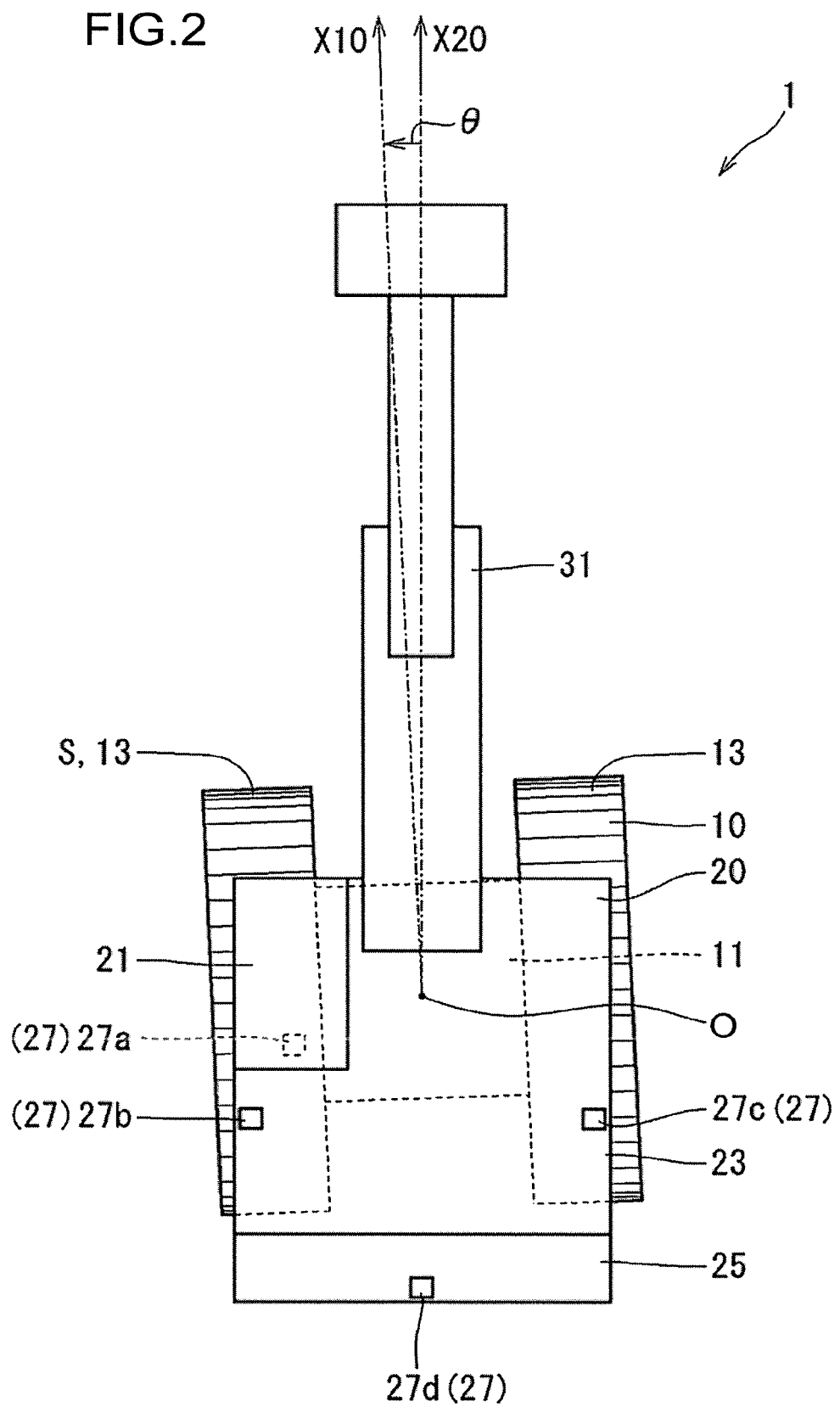
FIG. 2 is a view of the working machine 1 illustrated in FIG. 1 viewed from above.

The lower travelling body 10 is provided in a lower part of the working machine 1 and enables the working machine 1 to travel. As illustrated in FIG. 2, the lower travelling body 10 includes a lower frame 11 and a pair of left and right crawlers 13. The crawlers 13 enable the working machine 1 to travel. The crawlers 13 are attached to the left and right of the lower frame 11. Each of the pair of left and right crawlers 13 extends in a front-rear direction of the lower travelling body 10. One side in the front-rear direction of the lower travelling body 10 is referred to as a front side X10. The front side X10 is a direction in which the lower travelling body 10 moves forward.

The upper slewing body 20 is provided on the lower travelling body 10 and slews with respect to the lower travelling body 10. The upper slewing body 20 includes a cab 21, a guard 23, a counterweight 25, and a camera 27. The attachment 31 is attached to the upper slewing body 20. Here, the center of slewing of the upper slewing body 20 with respect to the lower travelling body 10 is referred to as a slewing center O. The side toward the attachment 31 from the counterweight 25 is a front side X20 of the upper slewing body 20 in the front-rear direction. The cab 21 is an operating cab for an operator to operate the working machine 1. In the present embodiment, the operator does not need to control the working machine 1 in the cab 21 because the working machine 1 is remotely controlled. The guard 23 covers devices such as an engine and a pump. The counterweight 25 is a weight arranged on a rear portion of the upper slewing body 20.

The camera 27 is provided for the operator who remotely controls the working machine 1 to obtain visual information. The camera 27 images surroundings of the working machine 1. The camera 27 images a particular part S of the lower travelling body 10. Only one camera 27 may be provided, or a plurality of cameras 27 may be provided. For example, the camera 27 includes an in-cab camera 27a, a left side camera 27b, a right side camera 27c, and a rear camera 27d. The in-cab camera 27a is disposed inside the cab 21, and images the cab 21 and a front side of the upper slewing body 20. The left side camera 27b images a left side of the upper slewing body 20. The right side camera 27c images a right side of the upper slewing body 20. The left side camera 27b and the right side camera 27c are disposed at, for example, a left end and a right end of the upper slewing body 20, and are attached to an upper surface of the guard 23. The rear camera 27d images a rear side of the upper slewing body 20. The rear camera 27d is arranged, for example, at a rear of the upper slewing body 20, and is attached to an upper surface of the counterweight 25 or the like. Note that as the camera 27, for example, there may be a camera 27 that images diagonally forward of the upper slewing body 20 or a camera 27 that images diagonally rearward of the upper slewing body 20.

The attachment 31 is constituted of an articulated machine. Specifically, the attachment 31 includes a boom rotatably attached to the upper slewing body 20, an arm rotatably attached to the boom, and a tip attachment rotatably attached to the arm. The tip attachment is, for example, a bucket, a nibbler, and a breaker. The attachment 31 is attached to the upper slewing body 20 and projects from the upper slewing body 20 to the front side X20.

Let us refer back to FIG. 1. The machine side controller 35 inputs and outputs various signals including various information. The machine side controller 35 is mounted in the working machine 1. When the working machine 1 is remotely controlled, the machine side controller 35 operates the working machine 1 according to a command input from the working machine control device 40.

The working machine control device 40 is a device that is provided outside the working machine 1 and remotely controls the working machine 1. The working machine control device 40 is a device that assists a slewing operation by the operator. The working machine control device 40 includes a seat 41, a slewing operation lever 43, a controller 60, and a notification unit 70.

The seat 41 is seated by the operator. The slewing operation lever 43 is an operation lever for remotely controlling the working machine 1, and is used by the operator to input an operation for slewing the upper slewing body 20 with respect to the lower travelling body 10. The slewing operation lever 43 is arranged beside the seat 41. When the amount of operating the slewing operation lever 43 is larger than a predetermined first threshold, the upper slewing body 20 slews with respect to the lower travelling body 10, and when the operating amount is equal to or smaller than the first threshold, the slewing of the upper slewing body 20 with respect to the lower travelling body 10 stops.

Figure 4:
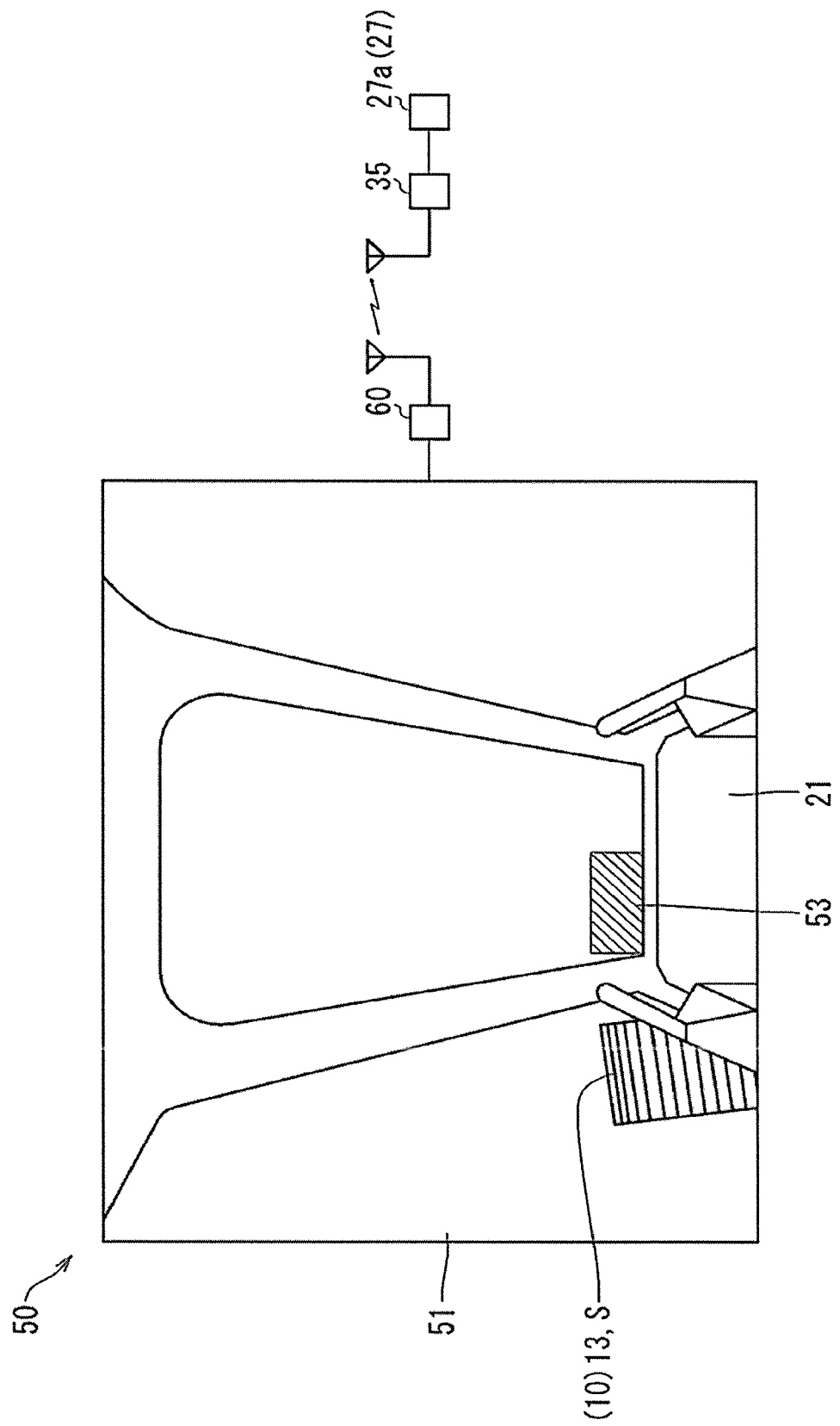

The notification unit 70 includes a display unit 50 and a speaker 71, and notifies the operator of the degree of coincidence between the slewing angle θ and a target slewing angle. The display unit 50 includes a display device such as a liquid crystal display that displays images and various information. The display unit 50 is arranged in front of the seat 41. As illustrated in FIG. 4, under control of the controller 60, the display unit 50 displays a display screen in which a target image 53 is displayed on a captured image 51 in a superimposed manner. Under control of the controller 60, the speaker 71 outputs a sound according to the degree of coincidence between the slewing angle θ and the target slewing angle as described later. The display unit 50 and the speaker 71 constitute the notification unit 70.

Figure 5:
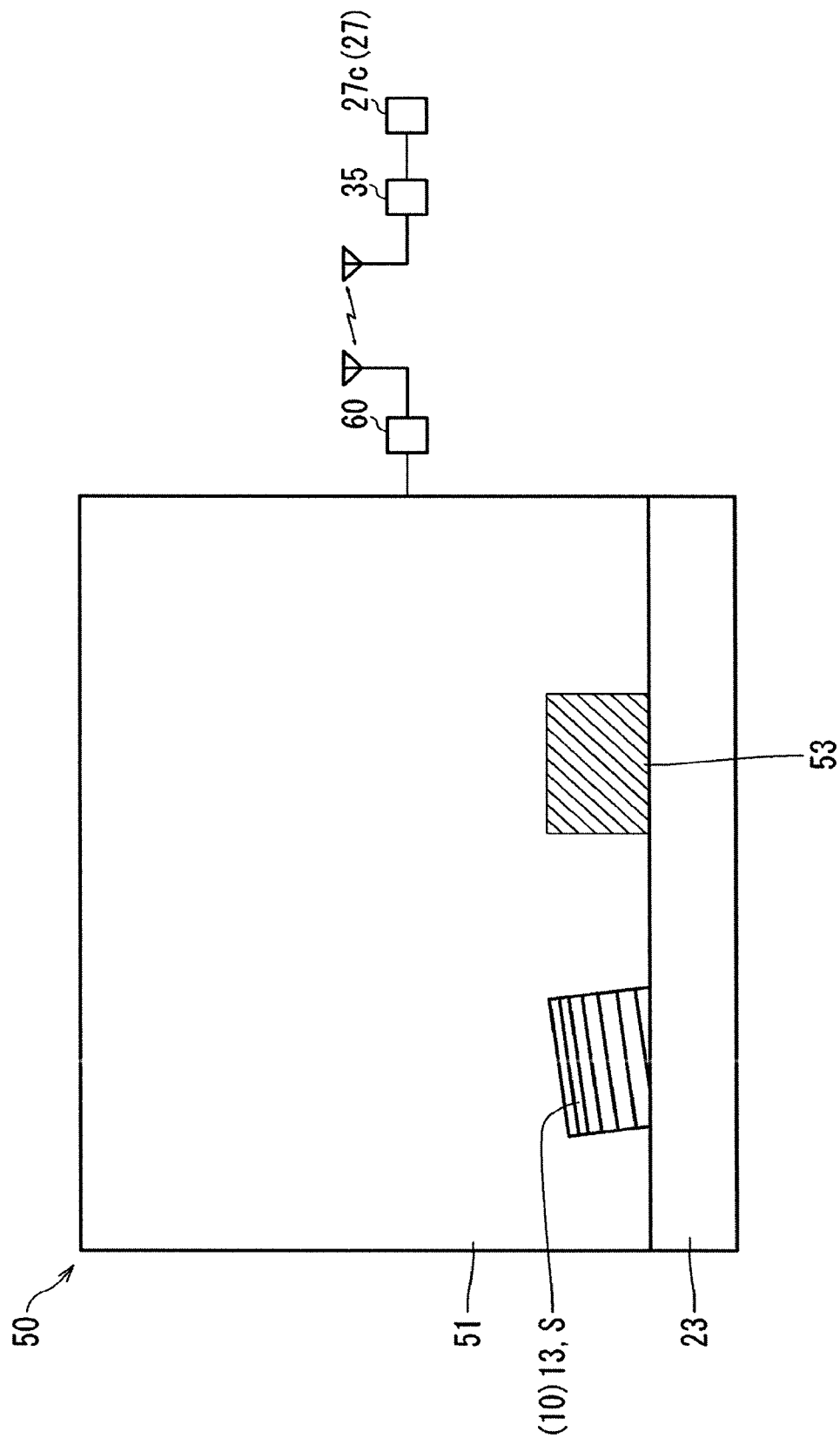
FIG. 5 is a view illustrating a captured image taken by a right side camera 27c.

The captured image 51 is an image obtained by the camera 27 imaging surroundings of the working machine 1 at a predetermined frame rate, for example. The captured image 51 includes, for example, the crawlers 13. Note that the crawlers 13 may not be illustrated in the captured image 51 depending on the slewing angle θ. For example, as illustrated in FIG. 4, the captured image 51 taken by the in-cab camera 27a includes an image inside the cab 21 and an image outside the cab 21 viewed from the inside of the cab 21. For example, as illustrated in FIG. 5, the captured image 51 taken by the right side camera 27c includes an image illustrating the right side of the guard 23. The captured image 51 taken by the rear camera 27d may include, for example, an image illustrating the rear side of the counterweight 25. When a plurality of cameras 27 are provided, displaying of the captured image 51 on the display unit 50 may be switched for each of the in-cab camera 27a, the left side camera 27b, the right side camera 27c, and the rear camera 27d.

The target image 53 is an image illustrating a target position of the lower travelling body 10, as illustrated in FIG. 4. Details of the target image 53 will be described later. The target image 53 can be displayed on the display unit 50, but it is possible that the target image 53 is not displayed on the display unit 50.

Let us refer back to FIG. 1. The controller 60 includes, for example, a computer including a processor such as a CPU and a non-volatile memory. The controller 60 inputs and outputs and calculates various signals. The controller 60 controls display on the display unit 50. A signal indicating the operating amount of the slewing operation lever 43 is input to the controller 60. The controller 60 includes a communication circuit (not illustrated), and wirelessly transmits and receives information to and from the machine side controller 35. The controller 60 transmits a signal indicating a command for operating the working machine 1 to the machine side controller 35. The controller 60 receives the captured image 51 taken by the camera 27 at a predetermined frame rate from the machine side controller 35 at a predetermined frame rate. The controller 60 includes a setting unit 61, a display control unit 62, a determination unit 63, a notification control unit 64, and a display switching unit 65. These components may be implemented by the controller 60 executing a control program, or may be configured by a dedicated electric circuit.

The setting unit 61 sets a target slewing angle of the upper slewing body 20 with respect to the lower travelling body 10 that is input by the operator. Here, it is sufficient if the setting unit 61 sets a predetermined angle as the target slewing angle when the operating amount of the slewing operation lever 43 becomes equal to or more than a predetermined amount. Alternatively, it is sufficient if the setting unit 61 sets an angle input by the operator using a not-illustrated operation key provided on the working machine control device 40 as the target slewing angle.

The display control unit 62 causes the display unit 50 to display a display screen on which a target image is displayed in a superimposed manner at a position on the captured image 51, the position being where a particular part is displayed when the slewing angle θ of the upper slewing body 20 with respect to the lower travelling body 10 reaches the target slewing angle set by the setting unit 61. Note that details of the determination unit 63, the notification control unit 64, and the display switching unit 65 will be described later.

(Operation)

Figure 3:
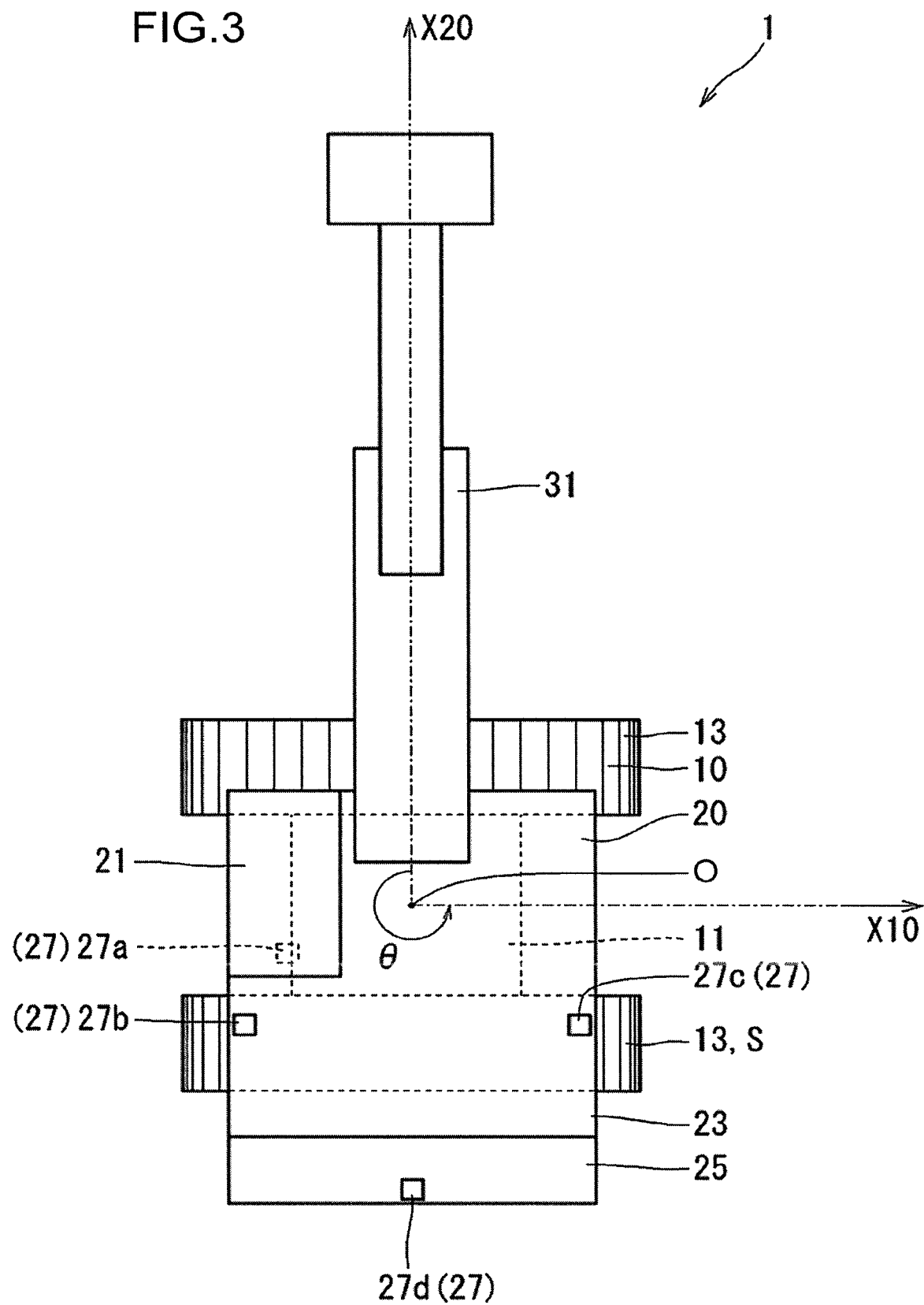
FIG. 3 is a view illustrating a state in which an upper slewing body 20 has slewed with respect to a lower travelling body 10.

The working machine control device 40 assists a slewing operation by the operator to make the slewing angle θ illustrated in FIG. 3 be equal to the target slewing angle.

The slewing angle θ is an angle of the upper slewing body 20 with respect to the lower travelling body 10. Specifically, the slewing angle θ is, for example, a clockwise angle of the front side X20 of the upper slewing body 20 when the working machine 1 is viewed from above, with the slewing center O being the center and the front side X10 of the lower travelling body 10 being a reference. Hereinafter, the slewing angle θ will be described with reference to FIGS. 2 and 3.

The target slewing angle may be set to any angle. For example, the target slewing angle is at least one of 0°, 90°, 180°, or 270°. The target slewing angle is input by the operator as described above. However, this is an example, and the target slewing angle may be set by the controller 60. Note that when the target slewing angle set by the controller 60 and the target slewing angle set by the operator conflicts with each other, it is just necessary to give priority to the target slewing angle set by the operator, for example.

Here, as illustrated in FIG. 4, a part of the lower travelling body 10, the part being imaged by the camera 27, is defined as a particular part S. That is, the particular part S refers to a part of the lower travelling body 10 appearing in the captured image 51, and the crawlers 13 correspond here. In the example of FIG. 4, in the captured image 51, only a front end of the left crawler 13 appears, and the remaining portions do not appear. Furthermore, the right crawler 13 has not appeared at all. In this case, the front end portion of the left crawler 13 appearing in the captured image 51 is the particular part S. Here, the part of the lower travelling body 10 appearing in the captured image 51 is employed as the particular part S, but the present invention is not limited to this. The particular part S may be, for example, an earth removing plate 115 illustrated in FIG. 7.

(Target Image 53)

As illustrated in FIG. 4, the target image 53 is displayed on the captured image 51 in a superimposed manner. The target image 53 is an image illustrating a target position of the particular part S. The operator performs a slewing operation so that the particular part S displayed in the captured image 51 matches the target image 53. Then, the slewing angle θ matches or substantially matches the target slewing angle.

In the captured image 51, the target image 53 is displayed at the display position of the particular part S displayed in the captured image 51 when the slewing angle θ reaches the target slewing angle. As the display position of the particular part S, a position calculated in advance according to the target slewing angle is employed. Specifically, as the display position of the particular part S corresponding to the target slewing angle, a position on the captured image 51 calculated in advance in consideration of the position of the camera 27 in the upper slewing body 20, the size of the upper slewing body 20, and the size of the lower travelling body 10 is employed. Alternatively, the display position of the particular part S corresponding to the target slewing angle may be calculated by performing an operation including positioning the slewing angle θ of the upper slewing body 20 at the target slewing angle, causing the camera 27 to take the captured image 51, and specifying the position indicating the particular part S from the captured image 51. This operation may be performed manually or by image processing.

As the shape of the target image 53, for example, a shape representing the particular part S can be employed. For example, the shape of the target image 53 may be the shape of a silhouette of the particular part S or the shape of a contour of the particular part S. The shape of the target image 53 may be a shape illustrating a range in which the particular part S can be displayed, or a shape of the contour of this range.

Note that it is sufficient if the display control unit 62 includes a table in which a plurality of target slewing angles and display positions and shapes of the target images 53 corresponding to the respective slewing angles are associated with each other, and causes the target image 53 to be displayed on the captured image 51 in a superimposed manner by referring to this table.

(Determination of Degree of Coincidence of Slewing Angle θ, Determination Unit 63)

The controller 60 illustrated in FIG. 1 determines the degree of coincidence between the slewing angle θ and the target slewing angle (hereinafter referred to as "degree of coincidence"). For this determination, the determination unit 63 recognizes an image illustrating the particular part S from the captured image 51 by using image recognition processing, and the degree of coincidence is determined based on the positional relationship on the captured image 51 between an image illustrating the recognized particular part S and the target image 53. The higher the degree of coincidence, the closer the slewing angle θ is to the target slewing angle. As the image recognition processing, for example, a process of recognizing the image illustrating the particular part S by template matching using the image of the crawlers 13 as a template can be employed. The determination unit 63 determines the degree of coincidence as follows, for example.

Let us refer to FIG. 4. It is just necessary that the determination unit 63 recognizes a characteristic part of the particular part S whose image can be easily recognized. As the characteristic portion, for example, a contour of the particular part S, a corner (vertex) of the contour of the particular part S, and one side of the contour of the particular part S can be employed.

The determination unit 63 may determine that the larger the area of a region in which the image illustrating the recognized particular part S and the target image 53 overlap is, the higher the degree of coincidence is. Alternatively, the determination unit 63 may determine that the closer the contour of the image illustrating the particular part S and the contour of the target image 53 are to each other, the higher the degree of coincidence is. In this case, it is just necessary that the determination unit 63, for example, obtains the center of gravity of the image illustrating the particular part S from the contour of the image illustrating the particular part S and obtain the center of gravity of the target image 53 from the contour of the target image 53, and determines the degree of coincidence to be higher as the distance between both the centers of gravity are closer.

Alternatively, the determination unit 63 may determine the degree of coincidence to be higher as the distance between a part of the contour of the image illustrating the particular part S and a part of the contour of the target image 53 corresponding to this part is higher. As the part of a contour, a vertex or a straight line portion of the contour can be employed. Here, if the part of the contour of the image illustrating the particular part S is an upper left vertex, what corresponds to this vertex is an upper left vertex of the contour of the target image 53. Further, if the part of the contour of the image illustrating the particular part S is a left side, what corresponds to this vertex is a left side of the target image 53.

Alternatively, the determination unit 63 may determine the degree of coincidence to be higher as the direction of a straight line portion in a longitudinal direction of the contour of the image illustrating the particular part S and the direction of a straight line portion in a longitudinal direction of the contour of the target image 53 corresponding to this straight line portion are closer to each other. Specifically, it is just necessary that the determination unit 63 determines the degree of coincidence to be higher as the angle between the straight line portion in the longitudinal direction of the contour of the image illustrating the particular part S and the straight line portion in the longitudinal direction of the contour of the target image 53 is smaller. For example, when the straight line portion in the longitudinal direction of the contour of the image illustrating the particular part S is a left side of the contour of the image illustrating the particular part S, what corresponds to this left side is a left side of the contour of the target image 53.

(Notification According to Degree of Matching of Slewing Angle θ, Notification Control Unit 64)

The notification control unit 64 illustrated in FIG. 1 changes a notification content to be notified by the notification unit 70 according to the degree of coincidence. The notification control unit 64 causes the notification unit 70 to perform notification using at least one of light including video, sound, or vibration, for example. The notification control unit 64 switches whether or not to output a notification from the notification unit 70 according to the degree of coincidence. The notification control unit 64 changes the notification content as follows according to the degree of coincidence.

[Example A] Example A is an example of notification using light including an image. Specifically, it is as follows.

[Example A1] Example A1 is an example in which the notification control unit 64 causes the display unit 50 to display a notification according to the degree of coincidence. Example A1 further includes two of Example A1-1 and Example A1-2 below.

[Example A1-1] Example A1-1 is an example in which a display mode of the target image 53 displayed on the display unit 50 is changed according to the degree of coincidence. For example, the notification control unit 64 may change at least one of shape, color, or brightness of the target image 53 according to the degree of coincidence. In this case, the operator can confirm the degree of coincidence without shifting the line of sight from the display position of the target image 53 to another position during the stewing operation.

As a mode of changing the shape of the target image 53, for example, a mode in which size of the target image 53 is increased as the degree of coincidence is higher can be employed. As a mode of changing the color of the target image 53, for example, a mode in which saturation of the target image 53 is increased as the degree of coincidence is higher can be employed. As a mode of changing the brightness of the target image 53, for example, a mode in which brightness of the target image 53 is increased as the degree of coincidence is higher can be employed.

[Example A1-2] Example A1-2 is an example in which the display mode of a display object displayed on the display unit 50 separately from the target image 53 is changed according to the degree of coincidence. As this display object, for example, a predetermined icon may be employed. Further, as a variation of the change of the display mode of the display object, the mode described in the above-mentioned example A1-1, that is, the mode in which at least one of the shape, the color, or the brightness is changed can be employed.

[Example A2] Example A2 is a mode in which a notification is output from a display provided separately from the display unit 50. In this case, the notification control unit 64 may display the display object illustrated in Example A1-2 on this display. Further, as a variation of change of the display mode of the display object, the mode illustrated in the above-mentioned example A1-1 can be employed. Furthermore, the notification control unit 64 may perform a notification by using a light emitting body instead of the display provided separately from the display unit 50. In this case, the notification control unit 64 may increase or decrease intensity of light output from the light-emitting body as the degree of coincidence increases, for example.

[Example B] Example B is an example of performing notification by sound. Specifically, it is as follows. The notification control unit 64 causes the speaker 71 to output a sound according to the degree of coincidence. For example, the notification control unit 64 changes the volume or type of the sound to be output by the speaker 71 according to the degree of coincidence. Specifically, it is just necessary that the notification control unit 64 increases the sound output from the speaker 71 as the degree of matching increases. Alternatively, the notification control unit 64 may increase or decrease frequency of the sound output from the speaker 71 as the degree of matching increases.

[Example C] Example C is an example of notification using vibration. Specifically, it is as follows.

[Example C1] Example C1 is an example in which the slewing operation lever 43 is vibrated in accordance with the degree of coincidence. In this case, a vibrator is arranged in the slewing operation lever 43. Then, it is just necessary that the notification control unit 64 changes vibration intensity or a vibration pattern of the vibrator of the slewing operation lever 43 according to the degree of coincidence between the slewing angle θ and the target slewing angle. For example, the notification control unit 64 may increase or decrease the vibration intensity of the vibrator as the degree of coincidence increases. Alternatively, the notification control unit 64 may change the vibration pattern of the vibrator as the degree of coincidence increases. As the change of the vibration pattern, for example, a mode in which the frequency of vibration is increased or decreased as the degree of coincidence increases may be employed. Alternatively, if a mode of intermittently driving the vibrator is employed as the vibration pattern, a mode of changing a pause time of the intermittent driving of the vibrator may be employed. Further, the vibration of the slewing operation lever 43 may be vibration in a direction in which the operation of the slewing operation lever 43 is less likely to be affected. For example, if the slewing operation lever 43 is operated in a front-rear direction, the slewing operation lever 43 may be applied with vibrations in left-right or up-down directions.

[Example C2] Example C2 is an example in which the seat 41 is vibrated according to the degree of coincidence. In this case, a vibrator is arranged in the seat 41. Then, it is just necessary that the notification control unit 64 changes vibration intensity or a vibration pattern of the vibrator of the seat 41 according to the degree of coincidence. Note that in the example C2, as a variation of the vibration applied to the vibrator of the seat 41, the example illustrated in the example C1 can be employed.

Note that if the working machine 1 is provided with a slewing angle sensor that detects the slewing angle θ, the notification control unit 64 may change the notification content output from the notification unit 70 based on the degree of coincidence between the slewing angle θ detected by the slewing angle sensor and the target slewing angle. As the slewing angle sensor, for example, a resolver or an encoder can be employed. In this case, the notification control unit 64 may determine the degree of coincidence to be higher as the difference between the slewing angle θ detected by the slewing angle sensor and the target slewing angle is closer to zero. When this mode is employed, it is not necessary to perform image recognition processing, and thus the processing load of the controller 60 is reduced.

(Switching Display of Target Image 53, Display Switching Unit 65)

For example, when it is not necessary to match the slewing angle θ with the target slewing angle, the operator does not need to see the target image 53. In such a scene, when the target image 53 is displayed on the captured image 51, the target image 53 may be an obstacle and visibility of the operator with respect to the captured image 51 may deteriorate. Therefore, the display switching unit 65 switches between displaying and hiding of the target image 53 on the display unit 50.

Specifically, the display switching unit 65 instructs the display control unit 62 to display the target image 53 on the display unit 50 when the operating amount of the slewing operation lever 43 is equal to or more than a second threshold (an example of a predetermined amount), for example. On the other hand, when the operating amount of the slewing operation lever 43 is less than the second threshold, the display switching unit 65 instructs the display control unit 62 not to display the target image 53 on the display unit 50.

The same value as the first threshold may be employed as the second threshold. Here, as described above, the first threshold is a threshold for determining whether or not to actually start slewing of the upper slewing body 20 with respect to the lower travelling body 10. When the second threshold and the first threshold are the same, the target image 53 is displayed on the display unit 50 at the timing when the upper slewing body 20 actually starts slewing. Further, if the second threshold is not the same as the first threshold, a value greater than 0 indicating a neutral position and less than the first threshold may be employed as the second threshold. In this case, the target image 53 is displayed on the display unit 50 even during a period from when the operator starts operating the slewing operation lever 43 to when the upper slewing body 20 actually starts slewing.

Note that the display switching unit 65 may switch displaying and hiding of the target image 53 on the display unit 50 based on a condition different from the condition that the operating amount of the slewing operation lever 43 is equal to or more than the second threshold. As another condition, for example, a condition that an operator operates a switch or a button (not illustrated) provided on the working machine control device 40 can be employed.

(Overview of Processing)

Next, an outline of processing of the working machine control device 40 according to the embodiment of the present invention will be described. First, the controller 60 obtains the captured image 51 transmitted from the machine side controller 35. Next, the controller 60 obtains the operating amount of the slewing operation lever 43. Next, the display switching unit 65 determines whether or not the obtained operating amount is equal to or more than the second threshold. If the operating amount is equal to or more than the second threshold, the display switching unit 65 notifies the setting unit 61 that the operating amount is equal to or more than the second threshold.

Next, the setting unit 61 sets the target slewing angle. Then, the display control unit 62 generates a display screen on which the target image 53 is superimposed and displayed at the position on the captured image 51 corresponding to the target slewing angle set by the setting unit 61, and causes the display unit 50 to display the display screen. Next, the determination unit 63 recognizes the image illustrating the particular part S from the captured image 51, and calculates the degree of coincidence based on the positional relationship between an image illustrating the recognized particular part and the target image 53.

Next, the notification control unit 64 causes the notification unit 70 to output a notification according to the calculated degree of coincidence. Thus, the display mode of the target image 53 is changed according to the degree of coincidence, or a sound according to the degree of coincidence is output from the speaker 71.

On the other hand, when the operating amount is less than the second threshold, the display switching unit 65 instructs the display control unit 62 to hide the target image 53 displayed on the display unit 50. Next, the display control unit 62 hides the target image 53. The displaying and hiding of the target image 53 are controlled by repeating the above processing in a predetermined calculation cycle.

(Examples of Issues During Remote Control)

As illustrated in FIG. 2, when the working machine 1 is moved straight, normally, the working machine 1 travels on the front side X20 of the upper slewing body 20 unless otherwise restricted. In this case, the slewing angle θ is set to 0°, and the lower travelling body 10 is moved straight to the front side X10. Further, the slewing angle θ may be set to 180°, and the lower travelling body 10 may move straight to the rear side (the side opposite to the front side X10). Further, as illustrated in FIG. 3, when work is performed while making the working machine 1 travel in the left-right direction of the upper slewing body 20, the lower travelling body 10 may move straight to the front side X10 or may move straight to the rear side with the slewing angle θ of 90° or 270°.

Here, when the operator operates the working machine 1 in the cab 21 of the working machine 1, the operator can adjust the slewing angle θ to the target slewing angle while directly observing the surrounding situation. For example, when the target slewing angle θ is 0°, 90°, 180°, or 270°, the operator performs the slewing operation while confirming parallelism or squareness with a linear portion of the lower frame 11 of the cab 21 and a linear portion (contour, shoe, or the like of the crawler 13) of the lower travelling body 10. At this time, the operator can check the parallelism and squareness of the cab 21 and the lower travelling body 10 from various angles. Note that the target slewing angle θ does not have to be 0°, 90°, 180°, 270°.

On the other hand, when the operator remotely controls the working machine 1, visual information obtained by the operator is limited as compared with the case where the operator in the cab 21 controls the working machine 1. Thus, for example, it becomes difficult for the operator to accurately grasp parallelism and squareness. For example, if the in-cab camera 27a is fixed in the cab 21, parallelism and squareness cannot be confirmed from various angles. Thus, since the visual information obtained by the operator is limited, there is a problem that it takes time and effort to match the actual slewing angle θ with the target slewing angle θ (problem example 1). Further, since the visual information obtained by the operator is limited, even if the actual slewing angle θ is slightly deviated from the target slewing angle θ, there is a problem that the operator does not easily notice this deviation (problem example 2). Therefore, the working machine 1 may travel in a direction different from the direction intended by the operator.

On the other hand, in the working machine control device 40 of the present embodiment, since the target image 53 is displayed in a superimposed manner on the captured image 51, the operator can easily match the slewing angle θ with the target slewing angle. Note that in the working machine control device 40, only part of the above problems may be solved.

Effects

Effects of the working machine control device 40 illustrated in FIG. 1 are as follows.

Effects of First Invention

A working machine control device 40 is capable of remotely controlling a working machine 1. The working machine 1 includes a lower travelling body 10 and an upper slewing body 20 that slews with respect to the lower travelling body 10. The working machine control device 40 includes a camera 27 that is disposed on the upper slewing body 20 and obtains a captured image 51 by imaging a particular part S that is a part of the lower travelling body 10, a display unit 50, and a controller 60.

[Configuration 1] The controller 60 includes a setting unit 61 that sets a target slewing angle of the upper slewing body 20 with respect to the lower travelling body 10, and a display control unit 62 that causes the display unit 50 to display a display screen in which a target image indicating a target position of the particular part is displayed in a superimposed manner at a position on the captured image 51, the position being where the particular part is displayed when a slewing angle of the upper slewing body 20 with respect to the lower travelling body 10 reaches the target slewing angle.

In the above [Configuration 1], when the operator performs a slewing operation such that the particular part S is displayed at the position where the target image 53 is displayed, the slewing angle θ matches the target slewing angle. Therefore, the operator can easily match the slewing angle θ with the target slewing angle even though the working machine 1 is remotely controlled.

Effects of Second Invention

[Configuration 2] The working machine control device 40 further includes a notification unit 70 that notifies a degree of coincidence between the slewing angle θ of the upper slewing body 20 and the target slewing angle. The controller 60 further includes a notification control unit 64 that changes a notification content to be notified by the notification unit 70 according to the degree of coincidence.

With the above [Configuration 2], the operator can grasp the degree of coincidence between the slewing angle θ and the target slewing angle from the notification content output from the notification unit 70. Consequently, the operator can more easily match the slewing angle θ with the target slewing angle.

Effects of Third Invention

[Configuration 3] The controller 60 further includes a determination unit 63 that recognizes from the captured image 51 an image illustrating the particular part S by using image recognition processing, and determines the degree of coincidence based on a positional relationship between the image illustrating the recognized particular part S and the target image 53 on the captured image 51.

With the above [Configuration 3], the determination unit 63 determines the degree of coincidence between the slewing angle θ and the target slewing angle based on the positional relationship between the image illustrating the particular part S and the target image on the captured image 51. Therefore, even if the slewing angle θ of the upper slewing body 20 is not detected using a slewing angle sensor that detects the slewing angle θ, the degree of coincidence between the slewing angle θ and the target slewing angle can be obtained, and it is possible to eliminate the need to provide the working machine 1 with the slewing angle sensor.

Effects of Fourth Invention

[Configuration 4] The controller 60 further includes a display switching unit 65 that switches between displaying and hiding of the target image 53 on the display unit 50.

With the above [Configuration 4], the displaying and hiding of the target image 53 on the display unit 50 are switched. Therefore, when the operator does not need to see the target image 53, the target image 53 can be hidden on the display unit 50, and the target image 53 in the captured image 51 can be prevented from becoming an obstruct.

Effects of Fifth Invention

As illustrated in FIG. 1, the working machine control device 40 includes a slewing operation lever 43 for remotely controlling the slewing of the upper slewing body 20 with respect to the lower travelling body 10.

[Configuration 5] The display switching unit 65 causes the display unit 50 to display the target image 53 when an operating amount of the slewing operation lever 43 is equal to or more than a predetermined amount, or causes the display unit 50 not to display the target image 53 illustrated in FIG. 4 when the operating amount of the slewing operation lever 43 is less than the predetermined amount.

With the above [Configuration 5], it is possible to switch between displaying and hiding of the target image 53 on the display unit 50 depending on whether or not the operator is performing an operation to match the slewing angle θ with the target slewing angle. More specifically, when the operator tries to match the slewing angle θ with the target slewing angle, the slewing operation lever 43 is operated. Then, in the above [Configuration 5], the target image 53 is displayed on the display unit 50 when the operating amount of the slewing operation lever 43 is equal to or more than the predetermined amount. Therefore, the target image 53 can be displayed on the display unit 50 when the operator tries to match the slewing angle θ with the target slewing angle. Further, when the operator does not perform an operation to match the slewing angle θ with the target slewing angle, the slewing operation lever 43 is in a neutral position. Then, in the above [Configuration 5], the target image 53 is not displayed on the display unit 50 when the operating amount of the slewing operation lever 43 is less than the predetermined amount. Therefore, the target image 53 can be prevented from being displayed on the display unit 50 when the operator is not performing an operation to match the slewing angle θ with the target slewing angle.

Effects of Sixth Invention

[Configuration 6] The target slewing angle is at least one of 0°, 90°, 180°, or 270° with reference to a predetermined direction of the lower travelling body.

With the above [Configuration 6], the following effects can be obtained. In a case where the target slewing angle is 0° with reference to the front side X10, the operator can easily match the slewing angle θ to 0°. Consequently, when the operator moves the lower travelling body 10 forward, the working machine 1 can be caused to accurately travel to the front side X10 of the upper slewing body 20. Further, when the operator moves the lower travelling body 10 backward, the working machine 1 can be caused to accurately travel to the rear side of the upper slewing body 20.

Further, in a case where the target slewing angle is 90° clockwise with reference to the front side X10, for example, the operator can easily match the slewing angle θ to 90°. Consequently, when the operator moves the lower travelling body 10 forward, the working machine 1 can be caused to accurately travel to the left side of the upper slewing body 20. Further, when the operator moves the lower travelling body 10 backward, the working machine 1 can be caused to accurately travel to the right side of the upper slewing body 20.

Similarly, in a case where the target slewing angle is 180° clockwise with reference to the front side X10, for example, when the operator moves the lower travelling body 10 forward, the working machine 1 can be caused to accurately travel to the rear side of the upper slewing body 20. Further, in a case where the target slewing angle is 180° clockwise with reference to the front side X10, for example, when the operator moves the lower travelling body 10 backward, the working machine 1 can be caused to accurately travel to the front side X20 of the upper slewing body 20.

Further, in a case where the target slewing angle is 270° clockwise with reference to the front side X10, for example, when the operator moves the lower travelling body 10 forward, the working machine 1 can be caused to accurately travel to the right side of the upper slewing body 20. Further, in a case where the target slewing angle is 270° clockwise with reference to the front side X10, for example, when the operator moves the lower travelling body 10 backward, the working machine 1 can be caused to accurately travel to the left side of the upper slewing body.

Modification Example

Figure 6:
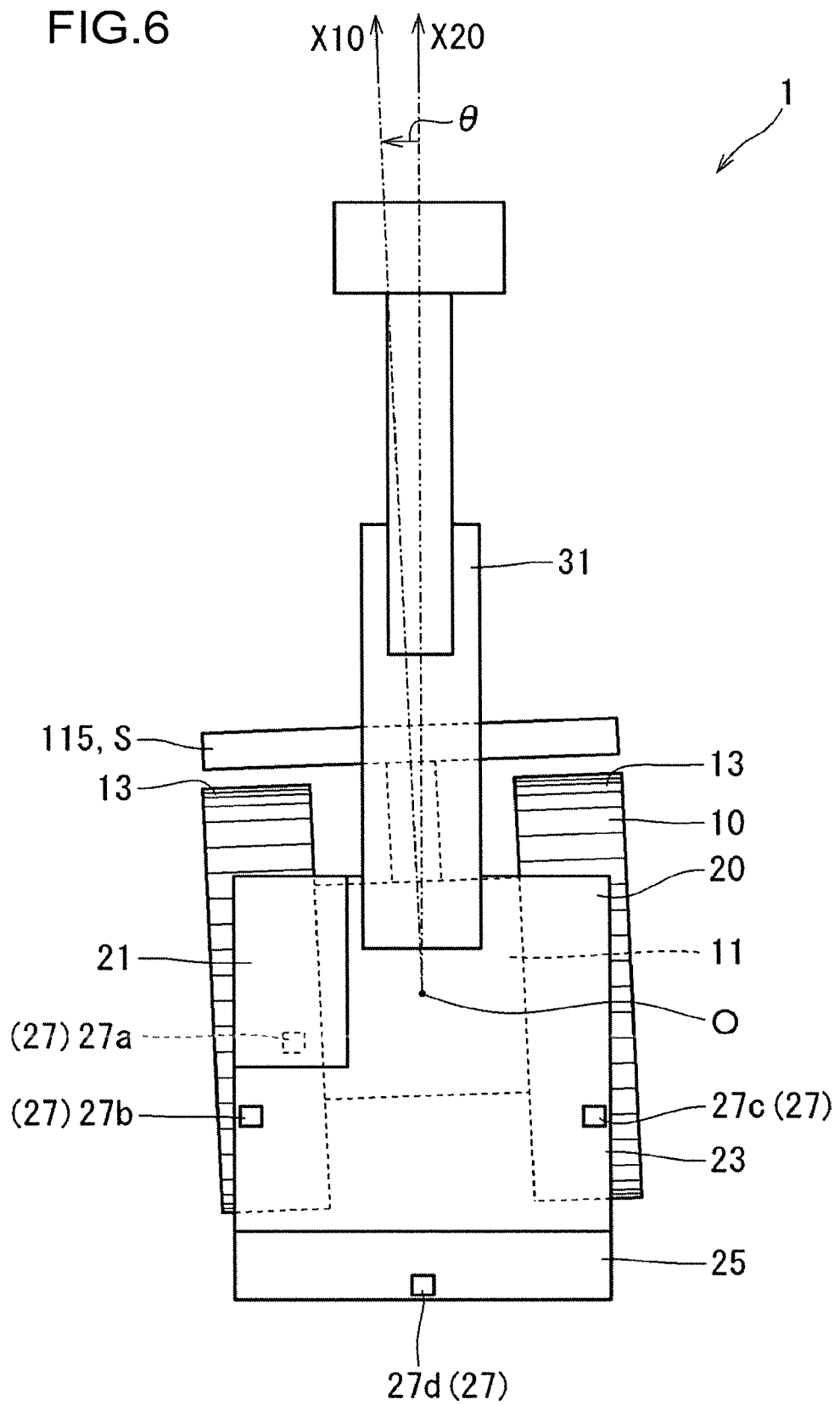
FIG. 6 is a view illustrating a modification example of a working machine 1.

A modification example of the working machine control device 40 (see FIG. 1) will be described with reference to FIGS. 6 and 7. As illustrated in FIG. 6, the lower travelling body 10 may include an earth removing plate 115 (dozer). The earth removing plate 115 is attached to the lower frame 11 so as to be movable in an up-down direction. The earth removing plate 115 is immovable in the left-right direction (the left-right direction of the lower travelling body 10) with respect to the lower frame 11. For example, the earth removing plate 115 is disposed on the front side X10 of the lower travelling body 10 with respect to the crawlers 13. The earth removing plate 115 has a substantially plate shape that is long in the left-right direction of the lower travelling body 10.

The particular part S is the crawlers 13 in the example illustrated in FIG. 4, but may be the earth removing plate 115 as illustrated in FIG. 7. When the particular part S is the crawlers 13, the display position of the crawlers 13 according to the target slewing angle in the captured image 51 is set to one position. On the other hand, the earth removing plate 115 illustrated in FIG. 7 is movable in the up-down direction. Therefore, when the particular part S is the earth removing plate 115, the display position of the earth removing plate 115 according to the target slewing angle in the captured image 51 is not fixed at one position but comes within a predetermined range. The "predetermined range" is the display range of the earth removing plate 115 in the captured image 51 when the earth removing plate 115 is moved from the upper end to the lower end of the movable range in the up-down direction with the slewing angle θ being the target slewing angle.

In this case, the target image 153 is constituted of a shape of an entire display range of the earth removing plate 115 displayed in the captured image 51 when the earth removing plate 115 is moved from the upper end to the lower end of the movable range in the up-down direction in a case where the slewing angle θ is set to the target slewing angle. The target image 153 may include, for example, a shape illustrating a silhouette of this entire display range. Alternatively, the target image 153 may include a contour shape of the entire display range. Alternatively, the target image 153 may include in a shape illustrating a part of the entire display range such as, for example, an end portion in the left-right direction of the entire display range.

When employing this modification example, it is just necessary that the display control unit 62 includes a table in which a plurality of target slewing angles and display positions and shapes of the target image 53 at respective target slewing angles are associated with each other, and the target image 153 according to the target slewing angle may be displayed on the captured image 51 with reference to this table.

Further, when employing this modification example, it is just necessary that the determination unit 63 recognizes the image illustrating the earth removing plate 115 from the captured image 51 and determines the degree of coincidence between this image and the target image 153, as in the above embodiment. However, it is preferable that the determination of the degree of coincidence is performed in consideration of the fact that the earth removing plate 115 can move in the up-down direction. For example, it is preferable that the determination unit 63 does not use the proximity in the up-down direction of the contour of the target image 153 with respect to the contour of the earth removing plate 115 displayed in the captured image 51 to determine the degree of coincidence.

Other Modification Examples

The above embodiment and modification examples may be variously modified. At least a part of the components of the above-described embodiment and at least a part of the components of the modification examples may be combined. For example, the arrangement and shape of each component may be changed.

For example, the particular part S is the crawler 13 in the example illustrated in FIG. 4 and the earth removing plate 115 in the example illustrated in FIG. 7, but may be both the crawler 13 and the earth removing plate 115.

The invention claimed is:

1. A working machine control device that remotely controls a working machine including a lower travelling body and an upper slewing body that stews with respect to the lower travelling body, the working machine control device comprising:
   a display unit;
   a camera that is disposed on the upper slewing body and obtains a captured image by imaging a particular part that is a part of the lower travelling body; and
   a controller,
   wherein the controller includes:
      a setting unit that sets a target slowing angle of the upper slewing body with respect to the lower travelling body; and
      a display control unit that causes the display unit to display a display screen in which a target image indicating a target position of the particular part is displayed in a superimposed manner at a position on the captured image, the position being where the particular part is displayed when a stewing angle of the upper slewing body with respect to the lower travelling body reaches the target stewing angle,
   wherein the controller is configured such that as a display position of the particular part corresponding to the target slewing angle, a position on the captured image calculated in advance in consideration of the position of the camera in the upper stewing body, the size of the upper stewing body, and the site of the lower travelling bods is employed.

2. The working machine control device according to claim 1, further comprising a notification unit that notifies a degree of coincidence between the stewing angle and the target stewing angle,
   wherein the controller further includes a notification control unit that changes a notification content to be notified by the notification unit according to the degree of coincidence.

3. The working machine control device according to claim 2, wherein the controller further includes a determination unit that recognizes from the captured image an image illustrating the particular part by using image recognition processing, and determines the degree of coincidence based on a positional relationship between the image illustrating the recognized particular part and the target image on the captured image.

4. The working machine control device according to claim 1, wherein the controller further includes a display switching unit that switches between displaying and hiding of the target image on the display unit.

5. The working machine control device according to claim 4, further comprising a stewing operation lever to which an operation for stewing the upper stewing body is input,
   wherein the display switching unit causes the display unit to display the target image when an operating amount of the stewing operation lever is equal to or more than a predetermined amount, and causes the display unit not to display the target image when the operating amount of the stewing operation lever is less than the predetermined amount.

6. The working machine control device according to claim 1, wherein the target stewing angle is at least one of 0°, 90°, 180°, or 270° with reference to a predetermined direction of the lower travelling body.

* * * * *